Aug. 23, 1927.
A. P. DENIS
1,640,183
TOWROPE
Filed Oct. 12, 1926
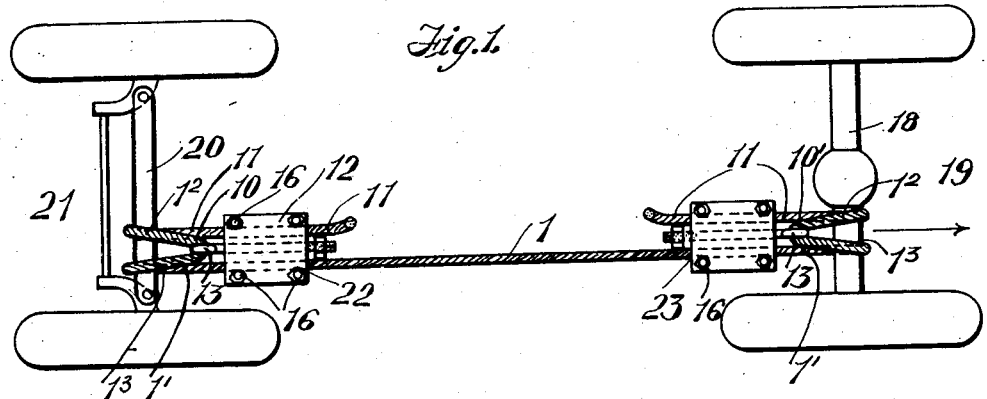
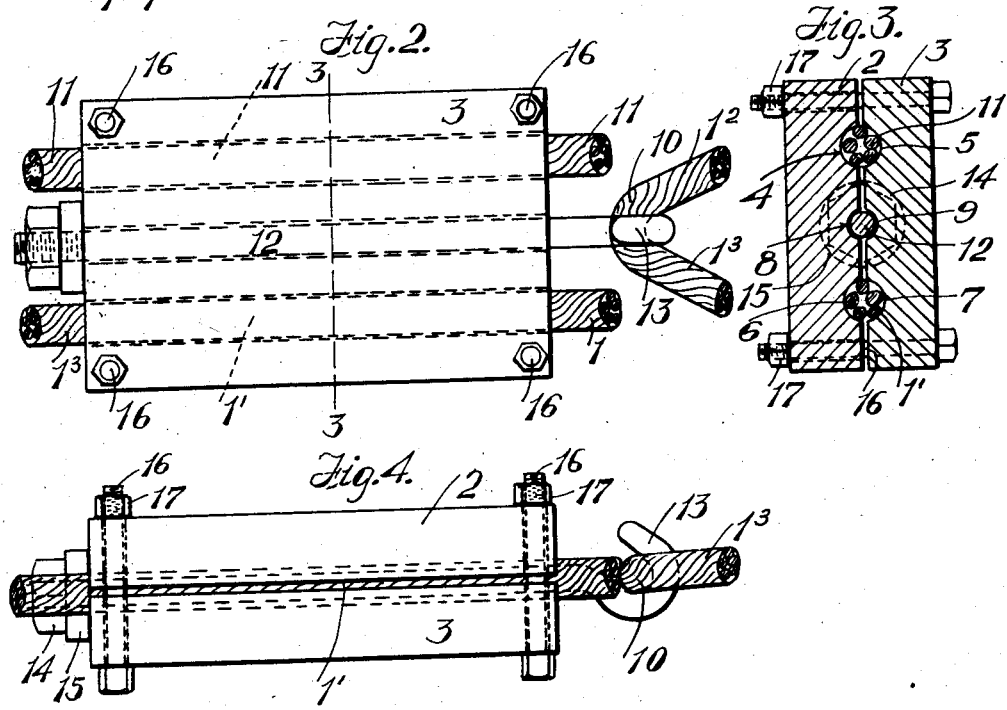
INVENTOR.
Albert P. Denis.
BY Harry W. Bowen.
ATTORNEY.

Patented Aug. 23, 1927.

1,640,183

UNITED STATES PATENT OFFICE.

ALBERT P. DENIS, OF SPRINGFIELD, MASSACHUSETTS.

TOWROPE.

Application filed October 12, 1926. Serial No. 141,113.

This invention relates to improvements in tow-ropes and is designed particularly for towing a motor vehicle, or the like, when the vehicle can not be propelled from its own power.

At the present time, so far as I am aware, tow-ropes are constructed so that only one strand of the rope passes around the axle or other part of the car being towed and only a single strand around the towing car with the result that the single strand often breaks at or near the axle due to the excessive tension on the single strand.

The present invention is designed to employ two strands of the rope and thus distribute the load and overcome the liability of breakage.

It comprises, in general, two pairs of clamps for securing the ends of the rope and having means for securing the clamps together, together with a hook which is also attached to the clamps. Each of the ends of the rope is formed with a loop which is attached to the hook on the clamps for providing two strands of the rope which are to be passed around the axle or other part of the vehicle. This construction is designed to permit the load or tension on the rope to be applied in a direct line thus avoiding the possibility of wear on the rope at the point of attachment to the clamps or on the axles.

Referring to the drawings:

Fig. 1 is a plan view showing the manner in which the tow-rope is used.

Fig. 2 is an enlarged detail plan view of the clamp and hook construction.

Fig. 3 is a vertical sectional view on the line 3—3 of Fig. 3, showing the rope and bolt of the hook in section also the bolts for securing the two members of the clamp together.

Fig. 4 is a side elevational view of Fig. 2.

Referring to the drawings in detail:

1 designates the middle portion of the rope as a whole; 2 and 3 the two clamping members for firmly securing the ends of the rope each of which is formed with the substantially semi-circular longitudinal grooves 4, 5, 6, and 7, and the intermediately located semi-circular grooves 8 and 9. In the grooves 6 and 7 are placed a portion of the rope 1. The end portions 11 which extend beyond the clamps are then folded to produce the loops 10 and 10′ and the free ends 11 of the rope are then carried backward and placed in the grooves 4 and 5 as shown. Located in the grooves 8 and 9 is the bolt 12 having the hook portion 13. This is secured in place by the nut 14 and washer 15. The grooves 8 and 9 are of such a size that the shank 12 of the bolt is free to turn, otherwise the strands of the rope in the grooves 4, 5, 6, and 7 would not be firmly secured by the clamps. Each of the ends of the rope are similarly secured by the clamps 2 and 3 shown in Fig. 3. For the purpose of firmly retaining the ends of the rope in place, four bolts indicated at 16 are passed through registering openings in the two members 2 and 3, whereby when the nuts 17 are tightened, the rope will be securely retained against removal or slipping.

The device is used as follows: The loop 10′ is passed around the axle 18 or other part of the vehicle 19 at one end. The other loop 10 is passed around the axle 20 or other part of the vehicle 21. The loop 10 and 10′ are then placed in the hooks 13. By means of this construction the main strand 1 of the rope will draw in a direct line and prevent bending of the rope at the points 22 and 23 and the axis of the hook 13 being located midway between the upper and lower clamping members 2 and 3 causing the loops 10 and 10′ to draw in a direct line and the double strands 1² and 1³ which pass around the axle distributes the load equally between the same thus preventing breakage at that point.

It will be observed from this description that it is only necessary to pass the loops 10 and 10′ around the axle and connect it to ends of the hooks 13 for attaching the tow-rope in place since the shank 12 of the hook 13 is loosely mounted in the semi-circular grooves 8 and 9, it is permitted to turn freely with the vertical movements of the axles or other part of the car.

What I claim is:

1. A tow-rope comprising a rope member, means for clamping the opposite ends of the rope which consists of a pair of members, each having matching grooves for receiving the rope, a portion of the ends of the rope extending beyond the clamps and brought back to form a loop, means for securing the ends of the rope in the clamps, a hook device attached to the clamps for receiving the loop, whereby two strands are provided for attaching the rope to a part, as described.

2. A motor car towing rope comprising a rope member, two pairs of clamping members, each member having grooves for receiving separate portions of the rope, the location of the clamps being such that a loop with two strands of the rope is formed at the outer ends of the clamps, and a hook device attached to the clamps for receiving the loop when the two strands are passed around an axle or other part of a motor car, and means for securing the clamp together.

3. A clamp for tow-ropes comprising two members each having two grooves which register for receiving and clamping two spaced portions of the rope, each member having another registering groove to loosely receive the shank of a hook, and means for securing the clamp members together the shank of the hook extending beyond the clamps and means to prevent the hook from becoming displaced.

4. In combination, a rope clamping members having grooves to receive and clamp spaced portions of the rope, to form a loop at each end of the rope to produce two strands for attachment to an axle of a motor vehicle, a hook on each of the clamps to receive the loop, as described.

5. In combination, a rope, clamping members having grooves to receive and clamp spaced portions of the rope, to form a loop at each end of the rope to produce two strands for attachment to an axle of a motor vehicle, a hook on each of the clamps to receive the loop, as described, and means for securing the clamping members together.

ALBERT P. DENIS.